United States Patent [19]

Piacente et al.

[11] 3,899,640

[45] Aug. 12, 1975

[54] DEVICE FOR BLOCKING TOLL CALLS FROM SUBSCRIBER TELEPHONES

[75] Inventors: Luigi Piacente; Sanzio Capannini, both of Milan, Italy

[73] Assignee: Societa Italiana Telecomunicazioni Siemens S.p.A., Milan, Italy

[22] Filed: Dec. 18, 1972

[21] Appl. No.: 315,892

[30] Foreign Application Priority Data

Dec. 17, 1971 Italy .................................. 32584/71

[52] U.S. Cl. .............................................. 179/18 DA

[51] Int. Cl. .............................................. H04m 1/66

[58] Field of Search .................... 179/18 DA, 27 CB

[56] References Cited

UNITED STATES PATENTS 3,651,275 3/1972 Regniere ......................... 179/27 CB 3,748,396 7/1973 Hestad ........................... 179/18 DA

*Primary Examiner*—William C. Cooper

*Attorney, Agent, or Firm*—Karl F. Ross; Herbert Dubno

[57] ABSTRACT

To prevent the unauthorized initiation of toll calls from a subscriber station of a telephone system, the telephone set is equipped with monitoring circuitry working into a binary/decimal counter which is activated during the dialing of the first (or some other specified) digit and, in response to one or more predetermined values of that digit, trips a flip-flop to place a shunt across the line loop with concurrent generation of a busy signal. The flip-flop is also tripped if dialing is commenced before reception of a dial tone from the central office. Spurious dial pulses generated by manipulation of the hook switch, registered by the counter as a first digit but too short to actuate the switching equipment of the central office, are recognized by a detector in the monitoring circuitry and trip the same flip-flop.

10 Claims, 4 Drawing Figures

DEVICE FOR BLOCKING TOLL CALLS FROM SUBSCRIBER TELEPHONES

Our present invention relates to a device for blocking the initiation of certain outgoing calls, such as toll calls, from a subscriber station of a telecommunication system.

The automation of telephony enables the initiation of toll calls from a subscriber station without the intervention of a central-office operator. In many instances, however, such toll calls are not permitted to other than specially authorized persons; pay stations, for example, are often restricted to local calls. Hotel rooms with dial-telephone service are another instance.

In the United States, toll calls are generally initiated by the dialing of an area code containing a 0 or a 1 as its second digit. In some localities, this area code is preceded by an initial digit 1. In other countries, long-distance calls require the initial dialing of a 0.

In commonly assigned U.S. patent application Ser. No. 186,692, filed Oct. 5, 1972 by one of us (Luigi Piacente) jointly with Giovanni Gandolfi, now U.S. Pat. No. 3,749,847, there has been disclosed a foolproof and tamperproof device for preventing the initiaion of toll calls (or, in an extreme case, of any outgoing calls) from a station accessible to persons not authorized to make such calls. Basically, such a device comprises an electronic pulse counter in combination with monitoring circuitry connected across a subscriber line for detecting dial pulses generated by periodic opening and closing of a line loop, this circuitry including pulse-shaping means for producing trains of stepping pulses in the rhythm of the dial pulses and for integrating each pulse train to derive therefrom an individual digital pulse which enables the counter, through the intermediary of a control circuit responsive to these digital pulses, to receive the stepping pulses pertaining to a particular digit. If this digit has a predetermined numerical value, or one of several such values (e.g. 0 or 1), the output lead of the counter trips an electronic switch such as a flip-flop to place a shunt across the dial or other call selector at the subscriber station so as to prevent effective open-circuiting of the line loop and to attenuate the dial pulse transmitted over the line to the central office, making these pulses incapable of actuating its selector switches.

Experience has shown that prior attempts at policing outgoing calls with the aid of a pulse counter are sometimes frustrated by manipulating the selector and the hook switch of the telephone set in a manner avoiding the reception of a dial tone from the central office or exchange before the first pulse is dialed, thereby aborting the operation of a call inhibitor normally alerted by such dial tone. The device referred to, therefore, advantageously includes an alternating-current receiver whose output is fed, together with the stepping pulses from the pulse shaper, to a discriminator which trips the dial-shunting switch independently of the counter if no dial tone is present prior to the generation of the first stepping pulse.

Even so, an astute user may find ways of deceiving the monitoring circuitry in order to place an unauthorized toll call, as by manipulating his switch hook to generate spurious dial pulses of such short duration that they do not actuate the switching equipment of the central office but nevertheless are capable of advancing the pulse counter into a position corresponding to an untransmitted initial digit (or to convert the actually transmitted inadmissible digit into a seemingly admissible digit as registered by the counter). Thus, it is an object of our present invention to provide an improved blocking device, of the general type described in the above-identified commonly owned application, which eliminates the possibility of such evasive maneuvering.

As further described in that commonly owned application, a device of this type may be provided with a disabling circuit for an electro-acoustic transducer (such as a microphone of a telephone receiver) which could be accidentally or fraudulently used to simulate the presence of a dial tone on the line, this disabling circuit being effective under the control of the pulse shaper in the presence of stepping pulses so long as no actual switching signals (dial tones, busy signals or ringing current) are received from the central office. Another object of our invention is to eliminate the need for such a disabling circuit, and for the additional wiring its entails, without reintroducing any risk of misuse or malfunction due to voice currents generated by the user.

In accordance with an important feature of our invention, the pulse shaper works into a detector circuit which trips the dial-shunting switch independently of the pulse counter in response to spurious dial pulses of less than a predetermined duration, e.g. in a range between 8 and 35 ms. The lower limit of this range (here 8 ms.) represents the response threshold of the pulse shaper which should be so low that shorter pulses or transients are incapable of actuating even the most sensitive central-office switches used in practice; otherwise, a user could transmit an inadmissible succession of dial pulses (e.g. ten such pulses representing the digit 0) by generating a lesser number (e.g. 8) of pulses with his dial and supplementing them with one or more very brief pulses generated by the hook switch. The upper range limit (here 35 ms.) should be so chosen that even a sluggish selector switch at the central office will respond to a pulse exceeding that limit, thereby insuring that the number of pulses registered by the counter always equals that effective to actuate the central-office equipment.

According to another feature of our invention, the dial-shunting switch may also be tripped independently of the counter by a trigger circuit controlled by the alternating-current receiver with the aid of storage means such as another flip-flop determining the relative priority of the dial tone and the first stepping pulse. If the dial tone is duly received before the user commences dialing, but if the user then operates his switch hook to interrupt the line loop for a prolonged period (greater than the lengths of a dial pulse but insufficiently to terminate the connection) in an effort to cut off the dial tone before transmitting a digit, the trigger circuit again causes the shunting of the call selector.

As likewise described in application Ser. No. 186,692, and U.S. Pat. No. 3,749,847 a busy-tone generator may be connected across the line by the dial-shunting switch to apprize the user of his wrongful selection. In some systems (such as those of the Ericsson type), however, a temporary interruption of the line loop takes place at the central office at the end of dialing and before the establishment of a talking connection; in such a case the generation of a busy tone would be objectionable wherefore, pursuant to still another feature of our invention, the local tone generator may be blocked by the aforementioned trigger circuit if the shunting operation is the result of such temporary open-circuiting of the line.

Since the placing of a shunt across the line by the monitoring circuitry has the sole purpose of preventing the transmission of further dial pulses, there is no need for maintaining the shunt at any time other than during dialing. Yet a further feature of our invention, therefore, resides in the provision of an inhibiting circuit, connected to the integrating stage of the pulse-shaping network, for making the dial-shunting switch ineffectual in the absence of a digital pulse. By this means it is possible, for example, to let a user talk normally to an operator after dialing 0 while still preventing him from calling a station having an 0 as the first digit of its call number, provided that the busy-tone generator is also cut off in that case.

The above and other features of our invention will now be described in detail with reference to the accompanying drawing in which.

Figure 1:
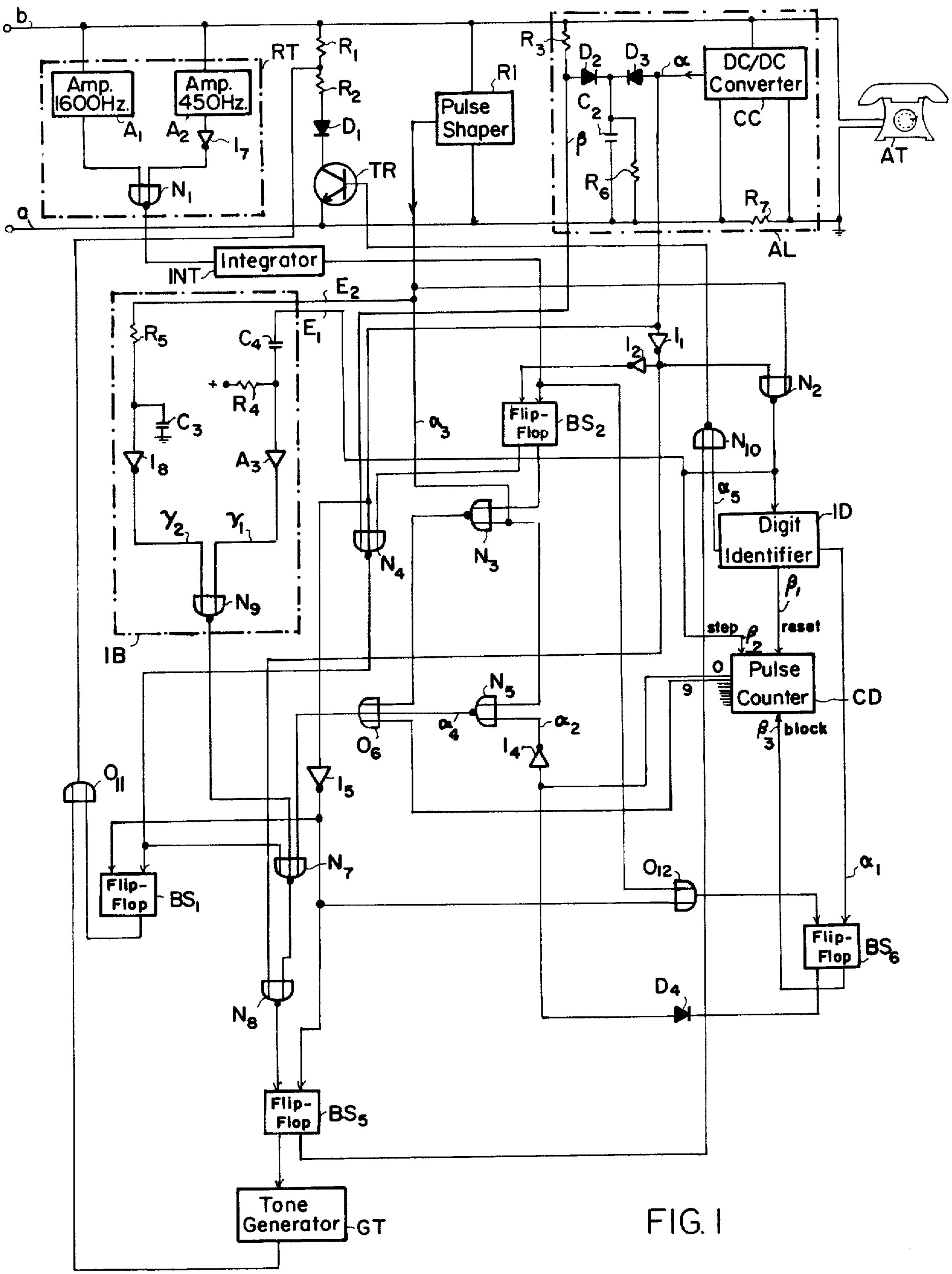
FIG. 1 is an overall circuit diagram of a representative embodiment.

The system shown in FIG. 1 comprises a subscriber station, including a telephone apparatus AT, connected via a two-wire line *a*, *b* to a remote central office. The apparatus AT is conventionally equipped with a dial and with a handset whose removal from its cradle operates a nonillustrated hook switch for closing a line loop by interconnecting conductors *a* and *b* through a set of dial-operated contacts. The wires *a* and *b* are continuously energized from the central office with d-c voltage (assumed to be relatively positive for wire *b*) which is picked up in a power-supply circuit AL, this circuit including a first network connected across the line in parallel with apparatus AT and a second network inserted in series therein in lead *a*. The first network comprises a capacitor $C_2$ in series with a diode $D_2$ and a resistor $R_3$; capacitor $C_2$ is shown shunted by a resistor $R_6$ through which it may slowly discharge. The second network includes a D-C/D-C converter CC connected across an impedance $R_7$ which is here shown as a resistor but which may also be a more complex circuit with capacitive and rectifying parallel branches as shown in the commonly owned application referred to. Converter CC has an output lead $\alpha$ connected through a diode $D_3$ to the ungrounded terminal of capacitor $C_2$.

Also connected across line *a*, *b* are a pulse shaper or squarer RI, a shunt circuit including the series combination of two resistors $R_1$, $R_2$, a diode $D_1$ and a normally open electronic switch in the form of a transistor TR, as well as an alternating-current receiver RT whose ground return has not been illustrated. Pulse shaper RI is of conventional construction, e.g. as disclosed in the commonly owned application, and works into an integrating circuit ID by way of a NOR gate $N_2$ whose second input is joined to converter output $\alpha$ through an inverter $I_1$. The purpose of diode $D_1$ is to protect the transistor TR against possible voltage reversals.

Tone receiver RT comprises a pair of tuned amplifiers $A_1$ and $A_2$ respectively passing a representative voice frequency (here of 1600 Hz) and a substantially lower frequency (here of 450 Hz) representing a dial tone transmitted by the central office upon closure of the line. A NOR gate $N_1$ has a first input connected directly to the output of amplifier $A_1$ and a second input connected to the output of amplifier $A_2$ by way of an inverter $I_7$. NOR gate $N_1$ works through a time-constant network or integrator INT into the setting input of a flip-flop $BS_2$ whose resetting input is joined to the output of inverter $I_1$ via a further inverter $I_2$.

A binary/decimal pulse counter CD has a resetting input $\beta_1$, a stepping input $\beta_2$ and a blocking input $\beta_3$ as well as ten stage outputs of which two, respectively labeled 9 and 0, are energized in response to a train of 9 or 10 dial pulses respectively constituting the digit 9 or 0; it has been assumed, in the present instance, that toll calls are initiated by the dialing of one or the other of these digits and that, for this reason, a call number beginning with either of these digits must not be transmitted by unauthorized users of the apparatus AT. (As disclosed in the commonly owned application, i.e. U.S. Pat. No. 3,749,847, a key-controlled or otherwise limitedly accessible master switch may be provided for the benefit of a subscriber authorized to make all calls, this switch being operable to deactivate the monitoring circuitry illustrated in FIG. 1).

Figure 2:
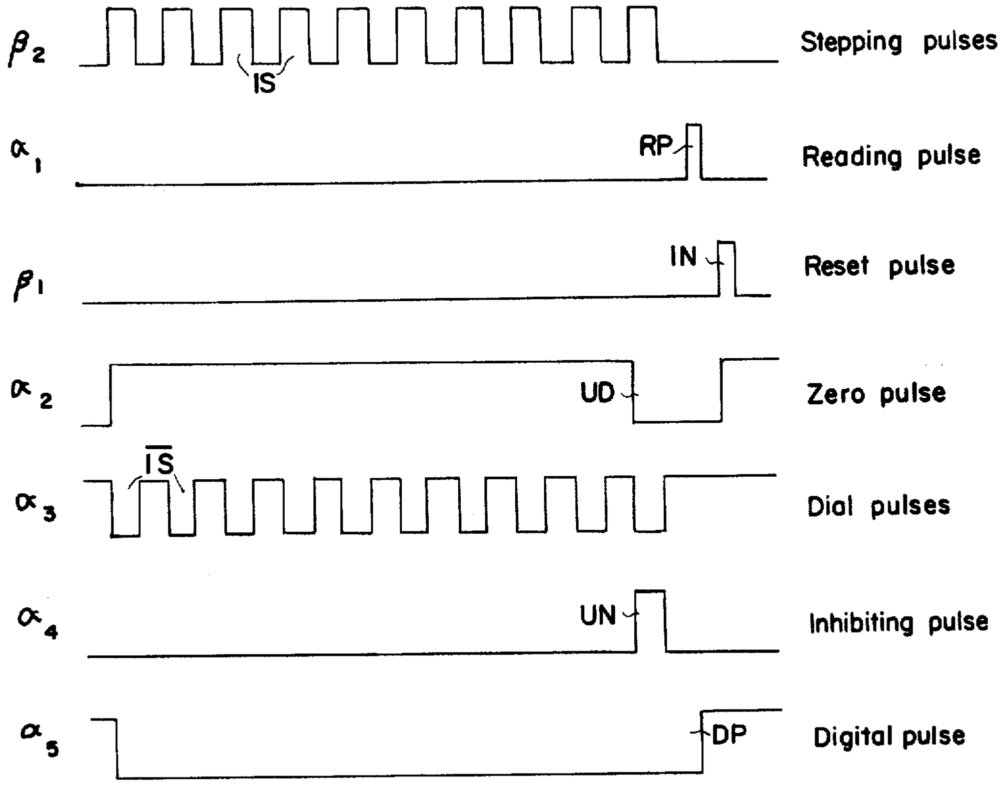

The output of pulse shaper RI on normal dialing is a train of dial pulses $\overline{IS}$, shown in FIG. 2, appearing on a lead $\alpha_3$ from which they are fed to NOR gate $N_2$. As long as output lead $\alpha$ of converter CC is properly energized, i.e. upon closure of the line loop at both the subscriber end and the central-office end of line *a*, *b*, inverter $I_1$ de-energizes the second input of NOR gate $N_2$ whose output is therefore a train of stepping pulses IS constituting an inverted replica of the dial pulses $\overline{IS}$. The stepping pulses IS are applied to integrator ID and to counter input $\beta_2$ in parallel.

Integrating circuit ID acts as a digit identifier by bridging the intervals between stepping pulses IS in a train of such pulses constituting a single digit. This circuit has a first output $\alpha_1$ leading to a setting input of a flip-flop $BS_6$, a second output $\alpha_5$ extending to a NOR gate $N_{10}$, and a third output terminating at the resetting or zeroizing input $\beta_1$ of pulse counter CD. Output $\alpha_1$ carries a pulse RP (FIG. 2), referred to as a reading pulse in the prior application, upon the termination of each digital pulse train; output $\alpha_5$ produces a digital pulse DP of generally rectangular shape for the duration of the pulse train. A resetting pulse IN is applied by integrator ID to counter input $\beta_1$ shortly after the disappearance of reading pulse RP.

The second input of NOR gate $N_{10}$ is connected to the reset output of a flip-flop $BS_5$ which is settable by the output of a NOR gate $N_8$ and resettable by zero potential on lead $\alpha$ via an inverter $I_5$. Flip-flop $BS_5$, when set, triggers a busy-tone generator GT whose output, in the form of an audio-frequency square wave, passes through an OR gate $O_{11}$ to the junction of resistors $R_1$ and $R_2$ in the shunt path across line *a*, *b*. With the other input of OR gate $O_{11}$ connected to the set output of a flip-flop $BS_1$, that junction is maintained at positive potential (close to that of wire *b*) whenever the latter flip-flop is set by the output of a NOR gate $N_4$ whose three inputs are respectively connected to the reset output of flip-flop $BS_2$, to output lead $\alpha$ of power supply AL and to another output $\beta$ of that power supply which originates at the junction of resistor $R_3$ and diode $D_2$.

Lead $\alpha_3$ terminates at respective inputs of two NOR gates $N_3$ and $N_5$, NOR gate $N_3$ having a second input connected to the set output of flip-flop $BS_2$ whereas the second input $\alpha_2$ of NOR gate $N_5$ is joined through an inverter $I_4$ to output 0 of counter CD. This counter output 0 is also connected through a diode $D_4$ to the reset output of flip-flop $BS_6$ whose set output energizes the blocking input $\beta_3$ of counter CD and which is settable by the reading pulse RP on lead $\alpha_1$. Flip-flop $BS_6$ is resettable through an OR gate $0_{12}$ whose first input is connected to the output of integrator INT, in parallel with the setting input of flip-flop $BS_2$, and whose second input receives the potential of lead $\alpha$ by way of inverter $I_5$. The output of this inverter is further tied to the resetting inputs of flip-flops $BS_1$ and $BS_5$ in parallel.

A short-pulse detector IB comprises a NOR gate $N_9$ with inputs $\gamma_1$, $\gamma_2$ and has two input leads $E_1$, $E_2$ respectively originating at the output of NOR gate $N_2$ and at the output of pulse shaper RI. A differentiation circuit comprising a series capacitor $C_4$ and a shunt resistor $R_4$ is inserted between lead $E_1$ and gate input $\gamma_1$ in series with an amplifier $A_3$, resistor $R_4$ connecting the live input of that amplifier to a source of positive voltage marked + (which may be tied to lead $\alpha$ or some other output of converter CC). A pulse- retarding delay circuit between lead $E_2$ and gate input $\gamma_2$ includes a series resistor $R_5$ and a shunt capacitor $C_3$ in series with an inverter $I_8$. NOR gate $N_9$ works into one input of a NOR gate $N_7$ having another input connected, in parallel with the setting input or flip-flop $BS_1$, to the output of NOR gate $N_4$; a third input of NOR gate $N_7$ is connected through an OR gate $O_6$ to the output lead (designated $\alpha_4$) of NOR gate $N_5$, to output lead 9 of counter CD and to the output of NOR gate $N_3$. NOR gate $N_7$ feeds one input of NOR gate $N_8$ having a second input tied to the output of inverter $I_1$.

Normal Operation

The user at subscriber station AT, wishing to initiate a call, lifts the receiver and awaits the arrival of a dial tone over the line before selecting the first digit. The flow of line current through resistor $R_7$ energizes lead $\alpha$ and removes voltage from one input of NOR gates $N_2$ and $N_8$ so as to make these gates switchable whereas NOR gate $N_4$ is blocked. Lead $\alpha_3$, as indicated in FIG. 2, is de-energized only in the presence of dial pulses $\overline{IS}$. The dial tone passes amplifier $A_2$ but not amplifier $A_1$ whereby NOR gate $N_1$ conducts and loads the integrator INT whose output, after a short period, sets the flip-flop $BS_2$ so that NOR gate $N_3$ becomes nontransmissive for the dial pulses. These dial pulses are, however, passed by NOR gate $N_2$ as stepping pulses IS reaching the pulse counter CD. (In the presence of noise on the line, amplifier $A_1$ also has an output so that flip-flop $BS_2$ is not set.)

The first train of stepping pulses IS is registered by identifier ID as a digit with consequent generation of pulses DP, RP and IN on leads $\alpha_5$, $\alpha_1$ and $\beta_1$, respectively. Owing to the relative time position of these pulses, as illustrated in FIG. 2, flip-flop $BS_6$ is not set by pulse RP until after the pulse counter CD has reached its final position which energizes one of its 10 output leads. If, in the present example, the counter stops on a lead other than those designated 9 and 0, nothing further happens in the monitoring circuit of FIG. 1 inasmuch as the set output of flip-flop $BS_6$ blocks at $\beta_3$ the pulse counter CD (which returns to zero in response to pulse IN) and prevents it from energizing any other of its outputs during further dialing.

If the user attempts to select a prohibited call number by dialing the number 9 as its first digit, the pulse produced on the corresponding output of counter CD passes the OR gate $O_6$ and blocks the NOR gate $N_7$ whereby NOR gate $N_8$, already primed by the de-energization of its second input as described above, conducts to set the dial-shunting flip-flop $BS_5$ which thereupon removes voltage from one of the inputs of NOR gate $N_{10}$. Since the latter gate is cut off at this time by voltage on lead $\alpha_5$, this operation is without immediate effect; on the other hand, tone generator GT is turned on by the flip-flop $BS_5$ and, by way of OR gate $O_{11}$, transmits a busy signal to the line and thereby to the earpiece of the user. If the latter now continues his prohibited selection by dialing a second digit, lead $\alpha_5$ is de-energized by the next pulse DP to that NOR gate $N_{10}$ conducts and turns on the transistor TR to complete the shunt across line $a$, $b$ with resulting attenuation of the dial pulses transmitted to the central office.

If the first selected digit is 0 instead of 9, counter output 0 carries voltage upon the occurrence of the tenth stepping pulse IS so that the previously energized lead $\alpha_2$ in the output of inverter $I_4$ is de-energized as indicated at UD in FIG. 2. The momentary removal of voltage from lead $\alpha_3$ by the last stepping pulse of the 10-pulse train thereupon causes the energization of lead $\alpha_4$ by an inhibiting pulse UN so that OR gate $O_6$ conducts as before and causes the setting of flip-flop $BS_5$ with the results discussed above.

The setting of flip-flop $BS_6$ at the end of the first digit de-energizes, via diode $D_4$, the input of inverter $I_4$ so that lead $\alpha_2$ goes again positive upon the occurrence of reset pulse IN. This is necessary if, as is here assumed, the pulse counter CD maintains the energization of its output lead 0 upon being reset by a pulse IN on its input $\beta_1$. Since lead 0 is deenergized immediately upon the reception of the first stepping pulse, gate $N_5$ cannot conduct in the reset state of the counter.

Upon termination of the connection, the de-energization of lead $\alpha$ results in the resetting of any of flip-flops $BS_1$, $BS_5$, $BS_6$ that had previously been set. Flip-flop $BS_2$, if set, is reset upon the initial energization of lead $\alpha$ whereas flip-flop $BS_6$ can also be restored to normal by the output of integrator INT in response to the arrival of the dial tone.

Improper Use

If the first signal to reach the tone receiver RT is a voice current including the test frequency of 1600 Hz, NOR gate $N_1$ cannot conduct whether or not there is also present the dial-tone frequency of 450 Hz.

If the user somehow manages to generate the dial-tone frequency alone, and to sustain it for a period sufficient to let the integrator INT respond, the real dial tone will be received from the central office in the interim so that the further operations proceed in the normal manner described above.

If the user starts dialing before generation of an actual or simulated dial tone, i.e. with flip-flop $BS_2$ reset, NOR gate $N_3$ conducts in response to the first dial pulse $\overline{IS}$ and transmits a setting pulse to flip-flop $BS_5$, via gates $O_6$, $N_7$ and $N_8$ in the aforedescribed manner. Again, tone generator GT is actuated and the transmission of further dial pulses is blocked.

Figure 3:
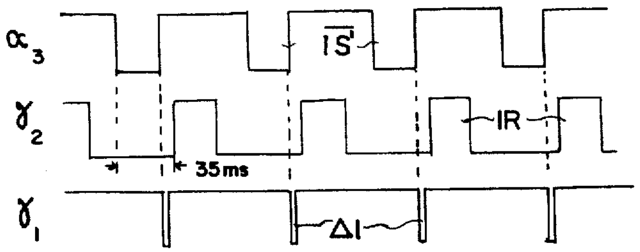
FIGS. 2 and 3 are sets of graphs serving to explain the operation of the system of FIG. 1.

If the user manipulates his hook switch to generate spurious dial pulses, the pulse shaper RI recognizes them only if their width is of a certain minimum duration, here assumed to be 8 ms. This is considerably shorter than the regular selection pulses generated by the dial of apparatus AT which, in the assumed case, have a length greater than 35 ms. Since the switching equipment at the central office might not respond to pulses in the range of 8 to 35 ms, pulse counter CD could be effectively decoupled from the central selector switches by such manipulation. The pulses $\overline{IS}$ emanating from pulse shaper RI, however, are also fed to input $E_2$ of detector circuit IB and, in the switchable state of NOR gate $N_2$, to the input $E_1$ thereof. Delay network $R_5$, $C_3$ of circuit IB has a time constant of 35 ms. so that the leading edge of a spurious dial pulse IS', inverted at $I_8$ as illustrated in FIG. 3, reaches the input $\gamma_2$ of NOR gate $N_9$ after a spike $\Delta I$ derived from the trailing edge of the same pulse by the differentiation circuit $C_4$, $R_c$ and amplified at $A_3$. The resulting simultaneous de-energization of both inputs of NOR gate $N_9$ transmits a setting pulse via cascaded NOR gates $N_7$ and $N_8$ to flip-flop $BS_5$ to make further dialing ineffectual and to actuate the tone generator GT.

In some systems the user, by operating his hook switch on receiving the dial tone, may cause the replacement of that tone by another signaling condition (termed subscriber's tone) which in turn gives way to an availability tone upon the selection of the first digit. The user might, therefore, take advantage of the switchover by dialing first a permitted digit (which would not be registered at the central office) and immediately thereafter, before the arrival of the availability signal, a prohibited digit which, however, does not step the counter CD since the monitoring circuitry identifies it as the second digit of a call number. In order to thwart such irregular operation, our invention makes use of a momentary de-energization of the line at the instant of switchover to trip the flip-flop $BS_5$ by an output pulse from NOR gate $N_4$ whose first input has been de-energized by a setting of flip-flop $BS_2$ while its other two inputs are briefly without voltage as the cutting-off of the power supply at the central office de-energizes the two output leads $\alpha$ and $\beta$ of circuit AL. It will be noted that such a setting of flip-flop $BS_5$ cannot occur at other instances, as upon the initial lifting of the receiver, inasmuch as flip-flop $BS_2$ is not set before the arrival of the dial tone whereby NOR gate $N_4$ remains blocked.

If, as with the aforementioned Ericsson exchange, a similar momentary de-energization of the line occurs upon the switching of registers at the central office after the completion of dialing, the setting of flip-flop $BS_5$ will not interfere with conversation (NOR gate $N_{10}$ being blocked in the absence of digital pulses) but the presence of the busy signal from generator GT would create a disturbance. For this reason, the output pulse of NOR gate $N_4$ transmitted via NOR gates $N_7$, $N_8$ to the setting input of flip-flop $BS_5$ is also received by the corresponding input of flip-flop $BS_1$ whose set output thereupon energizes an input of OR gate $O_{11}$ to generate a constant voltage in the output of that gate, thus effectively preventing the transmission of the busy-tone square wave to the junction of resistors $R_1$ and $R_2$.

Figure 4:
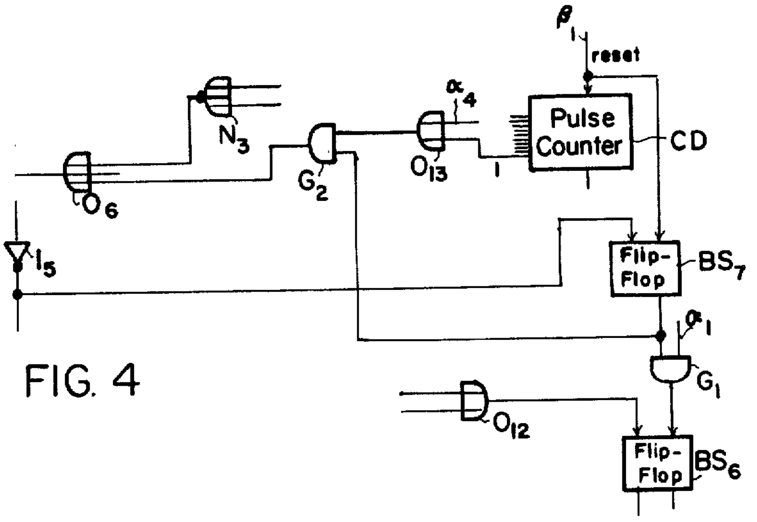
FIG. 4 is a fragmentary circuit diagram showing a modification.

In FIG. 4 we have illustrated a modification of the system of FIG. 1 designed to let the monitoring circuitry respond to the second digit rather than to the first one. For this purpose a flip-flop $BS_7$, resettable like some of the other flip-flops by the output of inverter $I_5$ upon the de-energization of lead $\alpha$, is settable by the first pulse IN on lead $\beta_1$ to unblock two AND gates $G_1$ and $G_2$. Gate $G_1$ prevents the setting of flip-flop $BS_6$ by a pulse RP on lead $\alpha_1$ until after flip-flop $BS_7$ has been set by the first digit, i.e. until after the second digit has been dialed, whereas gate $G_2$ blocks the transmission of the counter output to OR gate $O_6$ before the dialing of the second digit. In the instance illustrated, AND gate $G_2$ conducts upon the dialing of either a 0 or a 1 on the second digit, being then energized by the output of an OR gate $O_{13}$ from NOR gate $N_5$ via lead $\alpha_4$ or directly from counter CD by its first-stage output 1.

Naturally, the various NOR gates shown in FIGS. 1 and 4 may be replaced by other types of coincidence gates, such as AND or NAND gates, and many other changes may be made in the illustrated circuitry as is well understood by persons skilled in the art.

We claim:

1. A device for blocking the initiation of certain outgoing calls, characterized by a predetermined numerical value of a specified call-number digit, from a subscriber station of a telecommunication system connected via an outgoing line to a central office, comprising:

monitoring circuitry at said station connected across said line for detecting dial pulses generated at said station by a call selector periodically opening and closing a line loop;

pulse-shaping means in said circuitry for generating trains of stepping pulses in the rhythm of said dial pulses;

integrating means connected to said pulse-shaping means for deriving an individual digital pulse from any train of stepping pulses;

an electronic pulse counter connected to said circuitry for receiving said stepping pulses therefrom, said counter having at least one output lead electrically marked in response to a predetermined number of consecutive stepping pulses;

control means connected to said integrating means and responsive to a predetermined digital pulse in a sequence of such digital pulses for passing a concurrently generated train of said stepping pulses to said counter;

electronic switch means connected to said output lead for shunting said call selector, thereby preventing effective open-circuiting of said line loop and attenuating the dial pulses transmitted to said central office; and detector means connected to said pulse-shaping means for operating said switch means independently of said counter in response to spurious dial pulses of less than a predetermined duration.

2. A device as defined in claim 1 wherein said detector means comprises a first pair of parallel branches, one of said branches including delay means for retarding an incoming dial pulse by said predetermined duration, the other of said branches including differentiation means for deriving a spike from the trailing edge of an incoming dial pulse, and coincidence means connected to said branches for generating an operating signal for said switch means upon occurrence of said spike before the retarded dial pulse.

3. A device as defined in claim 1 wherein said circuitry further includes a receiver for alternating-current signals from said central office, a discriminating circuit including storage means connected to said receiver and said pulse-shaping means for determining the presence of a dial tone from the central office prior to generation of the first stepping pulse, and a connection from said storage means to said switch means for operating the latter independently of said contour upon the occurrence of a stepping pulse in the absence of such dial tone.

4. A device as defined in claim 3, further comprising sensing means responsive to current flow in said line loop and a trigger circuit connected to said storage means and said sensing means for operating said switch means independently of said counter upon prolonged interruption of the line loop following the occurence of a dial tone.

5. A device as defined in claim 4, further comprising a tone generator controlled by said switch means for placing a busy signal on said line concurrently with the shunting of said call selector, said trigger circuit including inhibiting means for said tone generator.

6. A device as defined in claim 1 wherein said switch means comprises a flip-flop, a switch controlled by said flip-flop and gate means between said flip-flop and said switch connected to said integrating means for preventing actuation of said switch by said flip-flop in the absence of a digital pulse.

7. A device for blocking the initiation of certain outgoing calls, characterized by a predetermined numerical value of a specified call-number digit, from a subscriber station of a telecommunication system connected via an outgoing line to a central office, comprising:

monitoring circuitry at said station connected across said line for detecting dial pulses generated at said station by a call selector periodically opening and closing a line loop;

pulse-shaping means in said circuitry for generating trains of stepping pulses in the rhythm of said dial pulses;

integrating means connected to said pulse-shaping means for deriving an individual digital pulse from any train of stepping pulses;

an electronic pulse counter connected to said circuitry for receiving said stepping pulses therefrom, said counter having at least one output lead electrically marked in response to a predetermined number of consecutive stepping pulses;

control means connected to said integrating means and responsive to a predetermined digital pulse in a sequence of such digital pulses for passing a concurrently generated train of stepping pulses to said counter;

electronic switch means connected to said output lead for shunting said call selector, thereby preventing effective open-circuiting of said line loop and attenuating the dial pulses transmitted to said central office; and inhibiting means connected to said integrating means for making said switch means ineffectual in the absence of a digital pulse.

8. A device for blocking the initiation of certain outgoing calls, characterized by a predetermined numerical value of a specified call-number digit, from a subscriber station of a telecommunication system connected via an outgoing line to a central office, comprising:

monitoring circuitry at said station connected across said line for detecting dial pulses generated at said station by a call selector periodically opening and closing a line loop;

pulse-shaping means in said circuitry for generating trains of stepping pulses in the rhythm of said dial pulses;

integrating means connected to said pulse-shaping means for deriving an individual digital pulse from any train of stepping pulses;

an electronic pulse counter connected to said circuitry for receiving said stepping pulses therefrom, said counter having at least one output lead electrically marked in response to a predetermined number of consecutive stepping pulses;

control means connected to said integrating means and responsive to a predetermined digital pulse in a sequence of such digital pulses for passing a concurrently generated train of said stepping pulses to said counter;

electronic switch means connected to said output lead for shunting said call selector, thereby preventing effective open-circuiting of said line loop and attenuating the dial pulses transmitted to said central office;

a receiver for alternating-current signals from said central office;

a discriminating circuit including storage means connected to said receiver via a time-constant network and further connected to said pulse-shaping means for determining the presence of a dial tone from the central office prior to generation of the first stepping pulse, said storage means being connected to said switch means for operating the latter independently of said counter upon the occurrence of a stepping pulse in the absence of such dial tone;

sensing means responsive to current flow in said line loop; and a trigger circuit connected to said storage means and said sensing means for operating said switch means independently of said counter upon prolonged interruption of the line loop following the occurrence of a dial tone.

9. A device as defined in claim 6, further comprising a tone generator controlled by said switch means for placing a busy signal on said line concurrently with the shunting of said call selector.

10. A device as defined in claim 9 wherein said trigger circuit includes blocking means for said tone generator effective upon operation of said switch means in response to prolonged interruption of the line loop.

* * * * *